Sept. 15, 1925.
D. M. HOLBROOK
TRAP NEST FRONT
Filed April 9, 1925
1,554,091
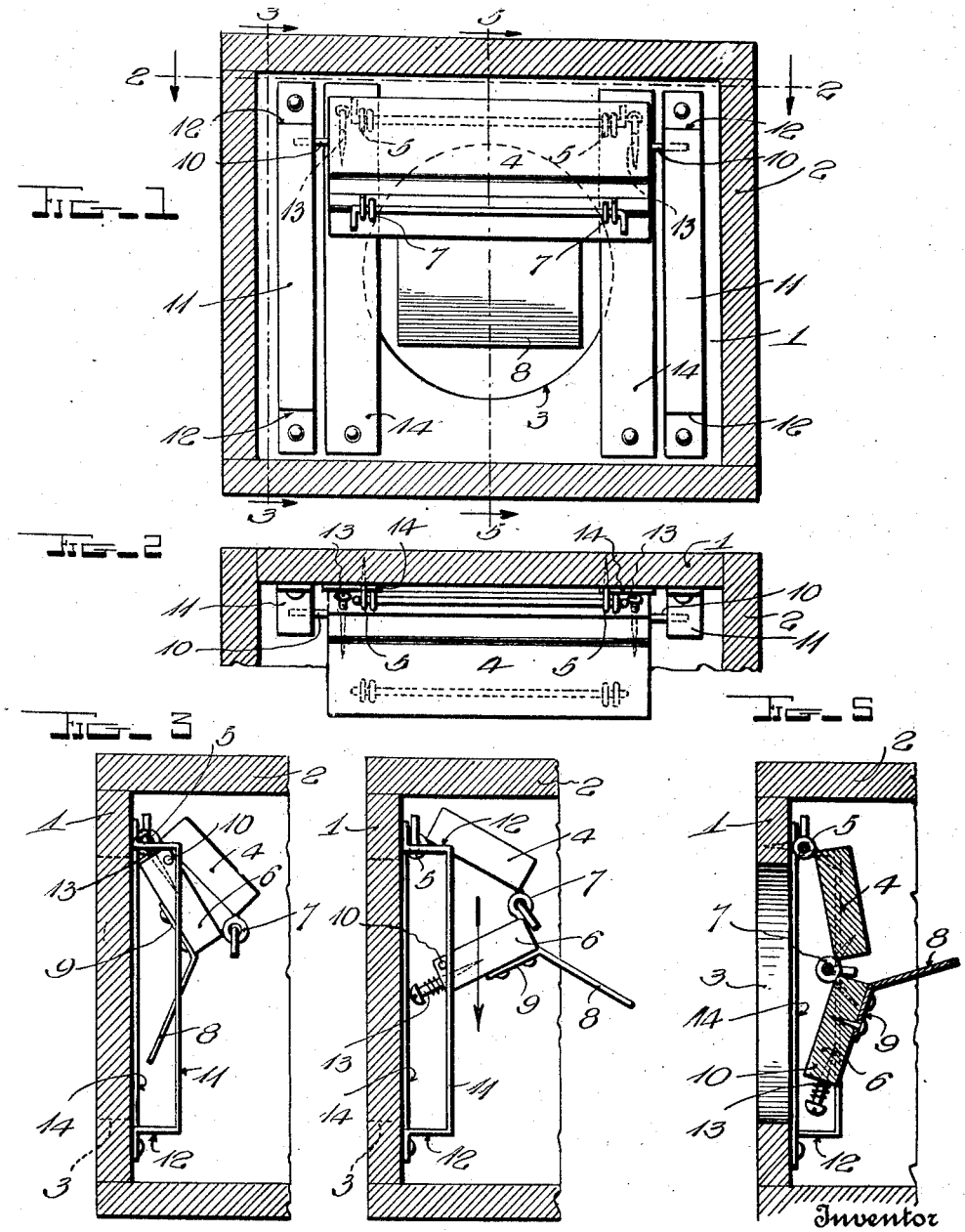

Patented Sept. 15, 1925.

1,554,091

UNITED STATES PATENT OFFICE.

DAVID M. HOLBROOK, OF PORTLAND, OREGON.

TRAP-NEST FRONT.

Application filed April 9, 1925. Serial No. 21,947.

*To all whom it may concern:*

Be it known that I, DAVID M. HOLBROOK, a citizen of the United States, residing at Portland, in the county of Multnomah and State of Oregon, have invented certain new and useful Improvements in Trap-Nest Fronts; and I do declare the following to be a full, clear, and exact description of the invention, such as will enable others skilled in the art to which it appertains to make and use the same.

My invention relates to improvements in trap nests, and it is the principal object of the invention to provide an extremely simple and inexpensive, yet a new and improved construction for closing the entrance opening of the nest front after a hen has entered the nest.

It is a further object to provide a construction which may be readily mounted on spaced portions of a long board having entrance openings formed therethrough, so that either the full length of the board or a portion of its length may be used in the construction of a plurality of nests, or a single nest, as occasion may demand.

With the foregoing in view, the invention resides in the novel subject matter hereinafter described and claimed, the description being supplemented by the accompanying drawing.

Figure 1 is a vertical transverse sectional view through a trap nest embodying my improvements, showing an inner side elevation of the nest front and the trap door mechanism mounted thereon, such mechanism being shown in set position.

Figure 2 is a horizontal sectional view on line 2—2 of Fig. 1.

Figure 3 is a vertical section on line 3—3 of Fig. 1.

Figure 4 is a view similar to Fig. 3 but showing the trap door partly closed.

Figure 5 is a vertical section on line 5—5 of Fig. 1, showing the door completely closed.

In the drawing above briefly described, the numeral 1 designates a trap nest front which may be formed of a board so that it constitutes a front for one nest, designated in the drawing at 2, or for a plurality of such nests, the front 1 being formed with an entrance opening 3 for each nest.

A trap door is mounted at the inner side of the front 1, it being understood that one of these doors is provided for each of the openings 3, only one door and one opening being herein shown. This door comprises an upper section 4 which is loosely pivoted at 5 to the nest front 1, at the upper edge of the opening 3, and a lower door section 6 having its upper edge loosely pivoted at 7 to the lower edge of the section 4, the two pivotal connections each preferably comprising a horizontal rod and screw eyes through which it passes.

The lower door section 6 is adapted to be swung upwardly against the outer side of the upper section 4, as shown in Fig. 3, thus placing the device in set position, and in order that the door may be tripped from the position of Fig. 3 to descend to the position of Fig. 5, a trigger is provided on the lower section 6. This trigger preferably consists of a sheet metal plate 8, one end of which is laterally bent as indicated at 9 to form a flange, said flange being secured by nails or the like to what forms the inner side of the door section 6, when the door is closed. When the door is open as shown in Fig. 3, the plate 8 projects downwardly from the door section 6, substantially across the entrance opening 3. Sufficient space is provided between the lower edge of the opening and the plate however, to permit a hen to readily insert her head. Then, as she forces her way into the nest, she tilts the plate 8 upwardly as will be clear from Fig. 4 and when this upward tilting of the plate has downwardly swung the door section 6 to a sufficient extent, the latter will descend by gravity, thus completely closing the door as shown in Fig. 5. Then, the plate 8 projects upwardly into the nest, so that it will be out of the way.

To guide the door section 6 during setting of the nest and also when the door closes, as well as to regulate the door to close with any desired degree of force, I have made novel provision, described below.

The characters 10 indicate a pair of pins projecting horizontally from the lower corners of the door section 6 and disposed in planes parallel with the nest front 1, said pins being preferably in the form of small nails driven into said door section. Behind these pins, vertical tracks 11 are provided to contact therewith, said tracks being preferably formed of strips of sheet metal with their upper and lower ends offset as at 12 and secured to the front 1. Threaded into the lower edge of the door section 6, two round-headed wood screws 13 have been shown, the heads of said screws constituting shoes which co-act with an additional pair of vertical tracks 14, the latter being disposed between the door and the nest front 1. The tracks 14 are preferably formed of somewhat resilient strips of sheet metal, the ends of these tracks being secured by nails or the like to the nest front 1. The screws 13 may be so adjusted that when the door reaches substantially a half-closed position, the heads of said screws and the pins 10, will bind frictionally against the tracks 14 and 11 to any desired degree. Thus, the door may be regulated to require any desired amount of force to effect its closing. This is particularly advantageous when getting young pullets acquainted with the nest, as they almost invariably enter part way and peck around in the straw of the nest, before entirely entering, and it will be seen that the nest will not trip until the fowl has forced upwardly with the necessary force on the plate 8, as she completely enters.

Excellent results are obtainable from the details disclosed and they are therefore preferably followed. However, within the scope of the invention as claimed, modifications may of course be made.

I claim:

1. A trap nest front having an entrance opening, an upper door section loosely pivoted at its upper edge near the upper edge of said opening, a lower door section loosely pivoted at its upper edge to the lower edge of the upper door section, the lower door section being adapted to swing upwardly against the outer side of the upper door section to set the door in trapping position, and a trigger secured to said lower door section and projecting downwardly therefrom adjacent the aforesaid entrance opening when the door is in said trapping position.

2. A trap nest front having an entrance opening, an upper door section loosely pivoted at its upper edge near the upper edge of said opening, a lower door section loosely pivoted at its upper edge to the lower edge of the upper door section, the lower door section being adapted to swing upwardly adjacent the outer side of the upper door section to set the door in trapping position, and a trigger plate secured to said lower door section and projecting downwardly therefrom substantially across the aforesaid entrance opening when the door is in said trapping position.

3. A trap nest front having an entrance opening, an upper door section loosely pivoted at its upper edge near the upper edge of said opening, a lower door section loosely pivoted at its upper edge to the lower edge of the upper door section, the lower door section being adapted to swing upwardly adjacent the outer side of the upper door section to set the door in trapping position, a pin projecting horizontally from a lower corner of said lower door section and disposed parallel to and behind the nest front, a vertical guide track engaging the rear side of said pin and having its ends stationarily anchored with respect to said front, a shoe projecting from and carried by said lower door section near one lower corner thereof, and a second vertical track between the door and the nest front and secured with respect to the latter, said second track being adapted to be engaged by said shoe when the door closes, whereby to control the closing movement of said door, at least one of said tracks being yieldable.

4. A structure as specified in claim 3, said shoe being formed by the head of a screw threaded into the lower door section, permitting adjustment.

In testimony whereof I have hereunto affixed my signature.

DAVID M. HOLBROOK.